United States Patent
Fang et al.

(10) Patent No.: US 9,772,801 B2
(45) Date of Patent: Sep. 26, 2017

(54) PERFORMING VOLUME EXPANSION IN STORAGE MANAGEMENT SYSTEM

(71) Applicant: International Business Machines Corporation, Armonk, NY (US)

(72) Inventors: Min Fang, Shanghai (CN); Hui Xiang Gu, Shanghai (CN); Xiao Yan, Shanghai (CN); Yi Qun Chen, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 13/756,146

(22) Filed: Jan. 31, 2013

(65) Prior Publication Data

US 2013/0198472 A1    Aug. 1, 2013

(30) Foreign Application Priority Data

Jan. 31, 2012  (CN) .......................... 2012 1 0021385

(51) Int. Cl.
*G06F 3/06*  (2006.01)

(52) U.S. Cl.
CPC .............. *G06F 3/067* (2013.01); *G06F 3/065* (2013.01); *G06F 3/0607* (2013.01); *G06F 3/0644* (2013.01)

(58) Field of Classification Search
CPC ................. G06F 2212/1041; G06F 2212/1048
See application file for complete search history.

(56) References Cited

U.S. PATENT DOCUMENTS

| | | | |
|---|---|---|---|
| 6,654,830 B1 | 11/2003 | Taylor et al. | |
| 6,681,307 B1* | 1/2004 | Humlicek | G06F 3/0644 707/999.202 |
| 6,718,436 B2 | 4/2004 | Kim et al. | |
| 6,832,289 B2* | 12/2004 | Johnson | G06F 3/0601 711/112 |
| 6,836,819 B2 | 12/2004 | Kano et al. | |
| 6,862,668 B2 | 3/2005 | McKean et al. | |
| 6,912,537 B2 | 6/2005 | Selkirk et al. | |
| 7,707,186 B2 | 4/2010 | LeCrone et al. | |
| 7,921,262 B1 | 4/2011 | Dash et al. | |
| 8,515,967 B2* | 8/2013 | Agarwala et al. | 707/748 |

(Continued)

FOREIGN PATENT DOCUMENTS

CN    101986285    3/2011

OTHER PUBLICATIONS

Lim, H.C., Babu, S., and J.S. Chase, "Automated control for elastic storage," Procs. of ICAC'10, New York, dated 2010.*

(Continued)

*Primary Examiner* — Hashem Farrokh
*Assistant Examiner* — Tracy A Warren
(74) *Attorney, Agent, or Firm* — Kenneth R. Corsello

(57) ABSTRACT

Volume expansion in a storage management system coupled to a storage system via a network is performed. A request for expanding an original volume of a first cluster located at the storage system to a target volume is received. A second cluster located at the storage system is obtained. A remaining storage space of the second cluster is larger than a storage space required by the target volume. The storage system is instructed to create the target volume at the second cluster, and the original volume is expanded to the target volume.

10 Claims, 7 Drawing Sheets

(56) References Cited

U.S. PATENT DOCUMENTS

| | | | | |
|---|---|---|---|---|
| 2006/0112222 A1* | 5/2006 | Barrall | ................ | G06F 3/0607 711/114 |
| 2011/0137868 A1* | 6/2011 | Sasage | ................ | G06F 3/0605 707/655 |
| 2011/0238672 A1 | 9/2011 | Agarwala et al. | | |
| 2013/0151683 A1* | 6/2013 | Jain | ...................... | G06F 3/0611 709/223 |

OTHER PUBLICATIONS

Lim et al. ("Automated control for elastic storage," Procs. of ICAC'10, New York, dated 2010.).*

"TwinStrata announces availability of CloudArray version 2.5," http://www.networkcomputing.com/cloud-storage/twinstrata-announces-availability-of-clo/229500501#, Apr. 28, 2011.

"New iSCSI SAN Solution from Overland Storage Delivers Effortless Data Management and Data Protection, Optimised for Virtualised Server Environments," http://vmblog.com/archive/2010/02/16/new-iscsi-san-solution-from-overland-storage-delivers-effortless-data-management-and-data-protection-optimised-for-virtualised-server-environments.aspx, Feb. 16, 2010.

http://www.twinstrata.com/CloudArray-software, http://www.twinstrata.com/CloudArray-software, currently believed to be dated no later than Apr. 28, 2011.

H. Lim et al., "Automated control for elastic storage," Procs. of ICAC'10, New York, dated 2010.

R. Buyya et al., "InterCloud: Utility-Oriented Federation of Cloud Computing Environments for Scaling of Application Services," Proceedings of the 10th International Conference on Algorithms and Architectures for Parallel Processing (ICA3PP 2010, Busan, South Korea, May 21-23, 2010), LNCS, Springer, Germany, 2010.

* cited by examiner

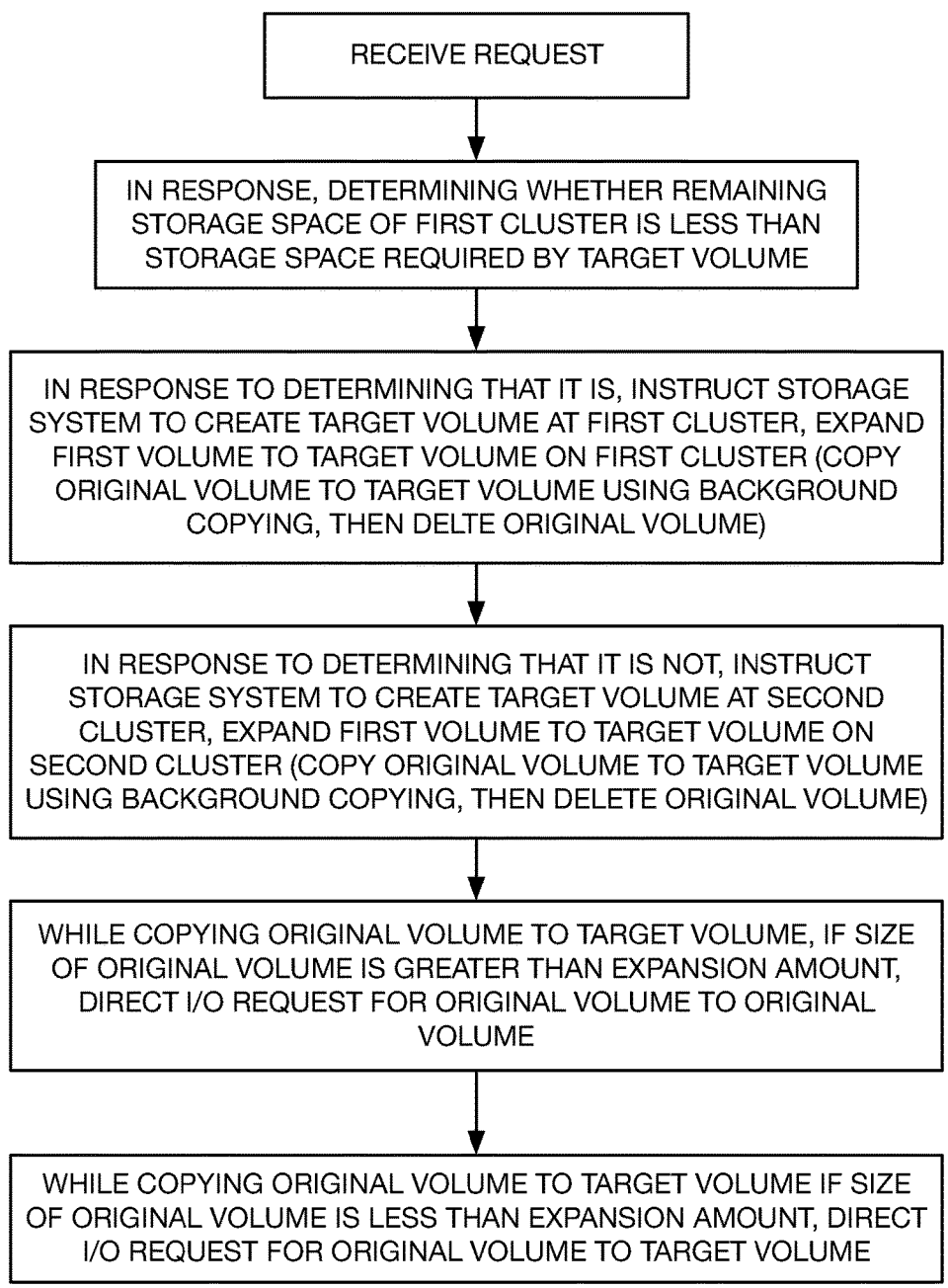

… (1)

PERFORMING VOLUME EXPANSION IN STORAGE MANAGEMENT SYSTEM

RELATED APPLICATIONS

The present patent application claims priority under 35 USC 119 to the previously filed Chinese patent application of the same title, filed on Jan. 31, 2012, and assigned China patent application number 201210021385.0.

BACKGROUND

Virtualization storage technology makes storage resource become a huge "storage pool" by separating the logic image of the storage resource from the physical storage, and establishes one or more virtual volume(s) of different sizes depending on specific requirements in the storage pool. These virtual volumes are dynamically allocated to various application servers over a storage network. In this way, full use of the storage capacity can be made, and centralized management of the storage and reduction of the storage cost can be achieved, accommodating quickly increasing enterprise data storage needs.

With the development of cloud computation technology, cloud storage has also developed rapidly. A storage layer of a cloud storage is an integrated solution that is implemented based on storage virtualization technology in combination with various storage devices. In cloud storage, storage devices constitute an actual, physical storage network. Storage virtualization adds a virtual layer between a physical storage system and a server to manage and control the storage devices and to provide an online data storage service to the server. Changes in storage hardware are completely transparent to the server. Major manufacturers have provided different kinds of cloud storage schemes by which service providers can provide online data storage services to enterprise end users, and the users can request corresponding storage resources from servers according to their own requirements. Cloud storage thus brings more flexibility and scalability to users.

SUMMARY

An example method of the disclosure is for performing volume expansion in a storage management system coupled to a storage system via a network. The method includes receiving a request for expanding an original volume of a first cluster located at the storage system to a target volume. The method includes obtaining a second cluster located at the storage system. A remaining storage space of the second cluster is larger than a storage space required by the target volume. The method includes instructing the storage system to create the target volume at the second cluster, and expanding the original volume to the target volume.

An example apparatus of the disclosure is for performing volume expansion in a storage management system coupled to a storage system via a network. The apparatus includes a request reception module to receive a request for expanding an original volume of a first cluster located at the storage system to a target volume. The apparatus includes a cluster lookup module to obtain a second cluster located at the storage system. A remaining storage space of the second cluster is larger than the storage space required by the target volume. The apparatus includes a target volume creation module to instruct the storage system to create the target volume at the second cluster. The apparatus includes an expansion module to expand the original volume to the target volume.

An example storage management system of the disclosure includes an apparatus for performing volume expansion in the storage management system. The apparatus includes a request reception module to receive a request for expanding an original volume of a first cluster located at the storage system to a target volume. The apparatus includes a cluster lookup module to obtain a second cluster located at the storage system. A remaining storage space of the second cluster is larger than the storage space required by the target volume. The apparatus includes a target volume creation module to instruct the storage system to create the target volume at the second cluster. The apparatus includes an expansion module to expand the original volume to the target volume.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

FIG. 9 depicts an example method.

DETAILED DESCRIPTION

Figure 1:
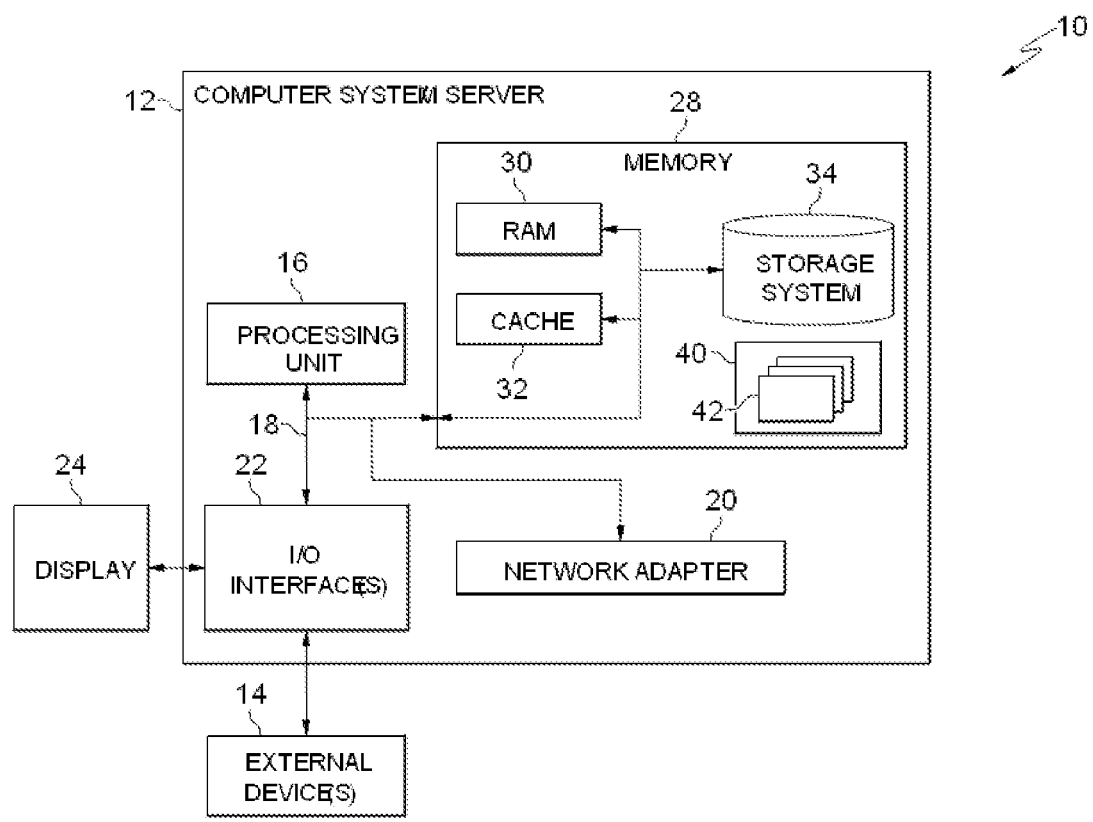
FIG. 1 depicts an example cloud computing node.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

One kind of technology in cloud storage is dynamic resource allocation, that is, volume expansion. Presently, the cloud storage schemes of most manufacturers have provided such volume expansion function, for example Storwize V7000, SVC, etc. Several physical storage devices of a cloud storage are configured into multiple clusters in which multiple storage servers, each containing multiple storage devices such as hard disks, may be included. Generally, the multiple storage servers are interconnected and built by a system administrator into one cluster. The storage capability of one cluster after virtualization constitutes one or more storage pool(s). A host server creates a volume, i.e. a virtual disk, on the storage pool(s) as needed, and then accesses the created volume via a device driver contained in the host server, that is, performs an I/O operation on the volume. The created volume is located on a cluster. It can be assumed that a physical storage device includes a cluster M of 4G storage space and a cluster N of 6G storage space. The cluster M has been already initialized into two volumes, i.e. volumes A and B, by the host server. For example, the storage space of the volume A is initialized into 1G while the storage space of the volume B is initialized into 3G. In use, the storage space of the volume A may be required to be expanded to 6G.

In conventional approaches, if there is additional, sufficient storage space in the cluster M, the volume expansion is allowed to be performed. However, the techniques disclosed herein pertain to the scenario in which, on the one hand, all the space of the cluster M has been initialized such that there is no additional space to be provided to users, and on the other hand, even if there is additional space in the cluster M available for expansion, due to the storage capacity thereof being limited, an inability to satisfy a requirement of storage space for expansion. This technical problem cannot be solved by conventional approaches. That is to say, there is a restriction on volume expansion functions provided presently that such volume expansion cannot be performed across clusters, which makes the volume expansion no longer possible to accommodate the requirements of the current cloud storage environment.

Although this disclosure includes a detailed description on cloud computing, implementation of the teachings recited herein are not limited to a cloud computing environment. Rather, the techniques disclosed herein are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The characteristics are as follows: on-demand self-service; broad network access; resource pooling; rapid elasticity; and measured service. On-demand self-service means a cloud consumer can unilaterally provision computing capabilities, such as server time and network storage, as needed automatically without requiring human interaction with the service's provider. Broad network access means capabilities are available over a network and accessed through standard mechanisms that promote use by heterogeneous thin or thick client platforms (e.g., mobile phones, laptops, and PDAs).

Resource pooling means the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity means capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service means cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The service models include Software as a Service (SaaS); Platform as a Service (PaaS); and Infrastructure as a Service (IaaS). Software as a Service (SaaS) means the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS) means the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS) means the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models include a private cloud; a community cloud; a public cloud; and a hybrid cloud. The private cloud means the cloud infrastructure is operated solely for an organization. It may be managed by the organization or a third party and may exist on-premises or off-premises. The community cloud means the cloud infrastructure is shared by several organizations and supports a specific community that has shared concerns (e.g., mission, security requirements, policy, and compliance considerations). It may be managed by the organizations or a third party and may exist on-premises or off-premises.

The public cloud means the cloud infrastructure is made available to the general public or a large industry group and is owned by an organization selling cloud services. The hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
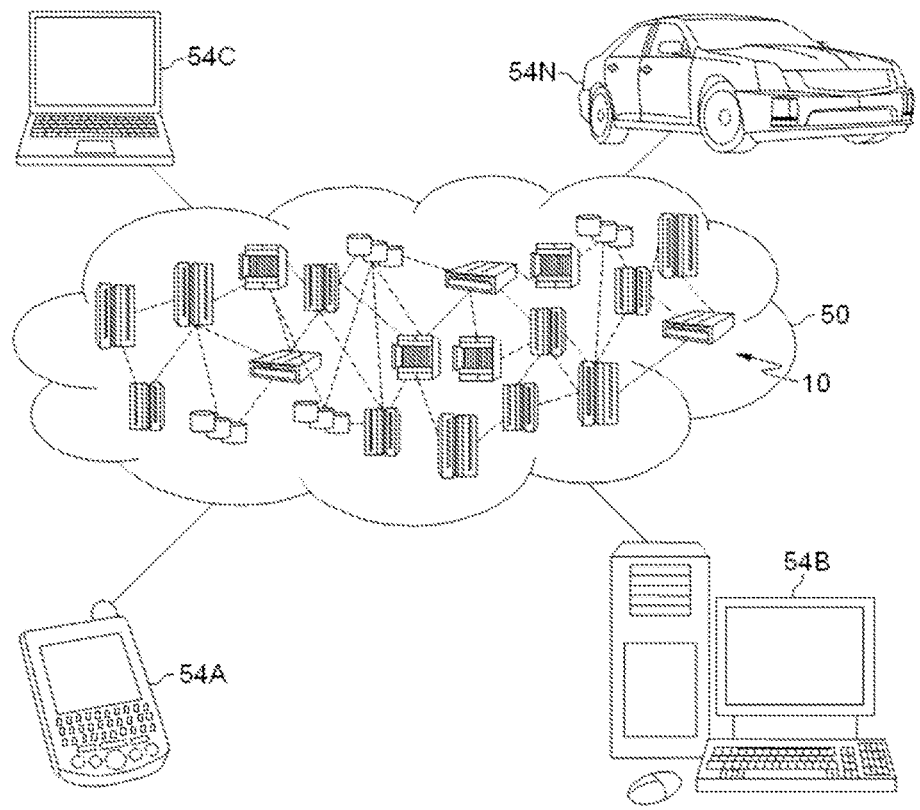
FIG. 2 depicts an example cloud computing environment.

Referring now to FIG. 2, an example illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
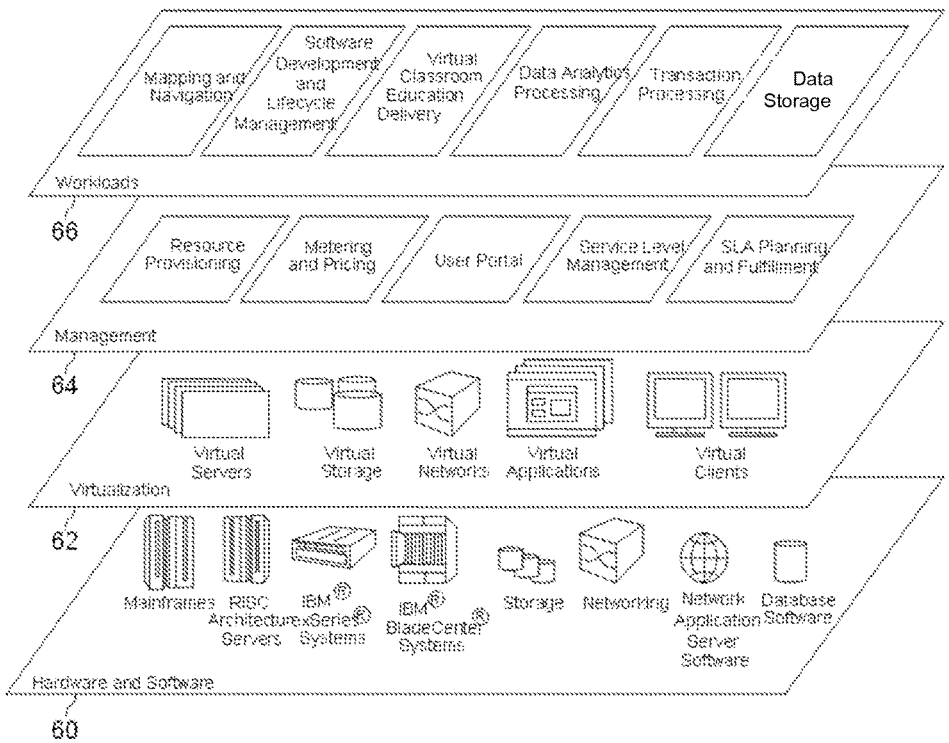
FIG. 3 depicts example abstraction model layers.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided.

Hardware and software layer 60 includes hardware and software components. Examples of hardware components include mainframes, in one example IBM® zSeries® systems; RISC (Reduced Instruction Set Computer) architecture based servers, in one example IBM pSeries® systems;

IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the following functions. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; data storage and the like. A service provider of cloud computing may provide a cloud storage function to an enterprise or personal user for storing data, for example personal album, enterprise data, etc.

Storage resources are generally managed by a storage management system. In cloud storage, a storage management system may be a management software platform located on a server (which could be a host server 401 as described blow) connected to a storage network. The storage management system is located at the layer 64 in FIG. 3.

Figure 4:
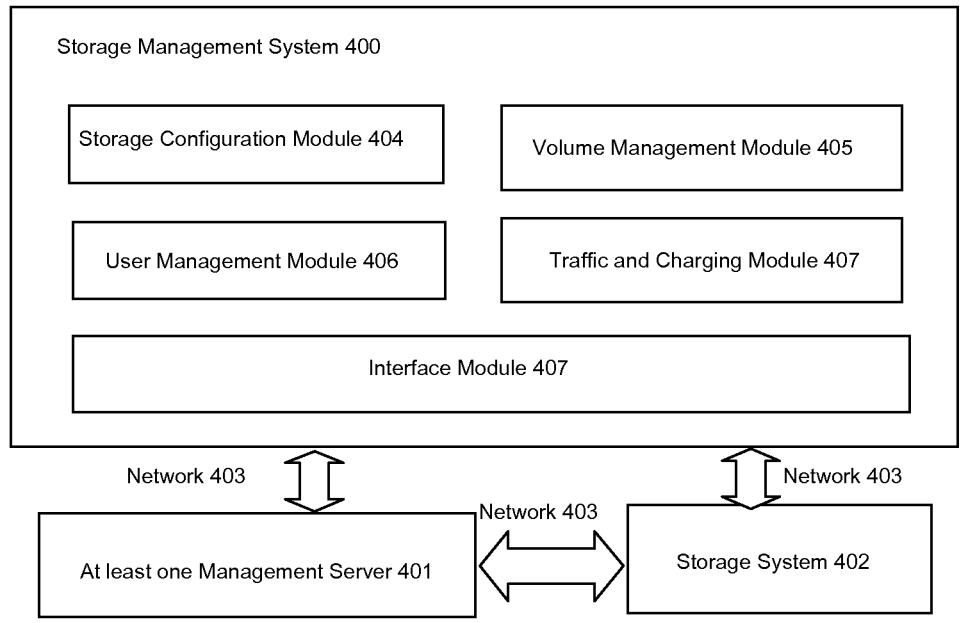
FIG. 4 depicts a storage management system.

FIG. 4 schematically shows a block diagram of an existing storage management system. According to FIG. 4, an interface module of a storage management system 400 is coupled to at least one host server 401 and a storage system 402 via a network 403. The host server 401 and the storage system 402 are located at layers 60 and 62 in FIG. 3. Inside the interface module may be included several sub-modules, for example, when the system 400 communicates with the host server 401, a host adaptor sub-module in the interface module of the system 400 may be utilized. When the system 400 communicates with the storage system 402, a storage device adaptor sub-module in the interface module of the system 400 may be utilized. When the system administrator or a system user of the storage management system 400 communicates with the system 400, a specially designed graphical user interface or communication protocol may be utilized.

The storage management system 400 includes modules that are always possessed by a general management system, for example, a user management module 406 for managing users of a storage cloud, including identity authentication of an user, permission management and so on, and a traffic and charging module 407 for recording users' usage conditions and charging according to users' usage conditions. Module 407 may also be divided into two modules, for example an usage module and an charging module, depending on specific system design. The storage management system 400 further includes a storage configuration module 404 and a volume management module 405.

When a system administrator, a system user or an application connected to the system has to perform virtualization management on the storage system 402, it can be required to utilize the storage configuration module 404. The storage configuration module, in response to receiving a request for creating a volume from a host server to a storage device in the storage system, assigns to the host server the required volume, which may be from one or more storage device(s), including magnetic disk, magnetic tape, electronic disk or the like, of one cluster. After the volume is successfully created, the device driver of the host server contains the mapping relationship between the host server accessing the volume and the volume address, so that the host can perform an I/O access operation on the volume.

When a user or application has to expand the storage space of a volume already created and the expanded storage space is within the range of the storage space that can be further provided by a cluster, the volume management module 405 in accordance with conventional techniques may be utilized. The existing volume management module 405 is able to expand the storage space of an already created volume within a cluster. There are many kinds of technology capable of realizing the expansion of the storage space of a volume within a cluster. For example, the volume management module 405 recreates an expansion volume for a cluster, updates the host server-volume address mapping relationship in the device driver of the host server according to the address mapping relationship between the original volume and the expansion volume. Accordingly the host is able to perform an I/O operation on the expansion volume. There are multiple kinds of other implementation methods as well.

However, when the remaining space within a cluster is not sufficient to be expanded to obtain an expansion volume, the volume management module 405 is unable to provide this functionality. More storage space, for example a magnetic disk, may be added to a cluster, but this, however, will increase cost, especially in a cloud storage environment where there is much storage space in fact and only the storage space of the cluster is insufficient. Therefore, the solution of increasing the number of storage devices is not economical for a provider providing cloud storage.

Figure 5:
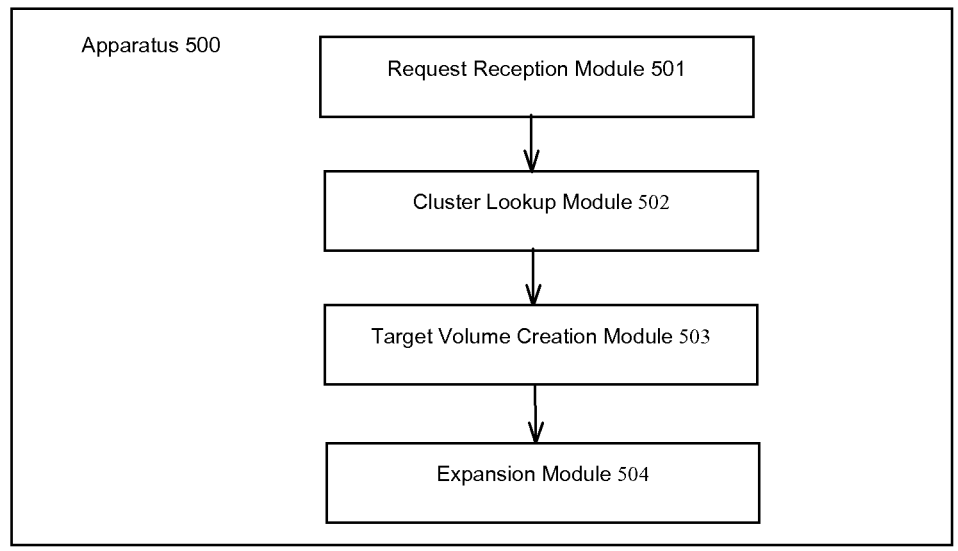
FIG. 5 depicts an example apparatus for performing volume expansion in a storage management system.

By comparison, the techniques disclosed herein include a method and an apparatus for performing volume expansion in a storage management system which is coupled to a storage system via a network, and that overcome the problems described above. FIG. 5 shows a structural diagram of an example apparatus 500 for performing volume expansion in a storage management system. The apparatus 500 may function as an individual volume expansion module in the storage management system of FIG. 4 or a sub-module of the volume management module 405 in the system of FIG. 4.

According to FIG. 5, the apparatus 500 for volume expansion includes a request reception module 501 which is configured to receive a request for expanding an original volume of a first cluster located at the storage system to a target volume. The request for volume expansion may be from a system administrator, a user having permission or a running application coupled to the storage management system and the storage system via a network and so on. The apparatus 500 includes a cluster lookup module 502 which is configured to obtain a second cluster located at the storage system, the remaining storage space of the second cluster being larger than the storage space required by the target volume. The apparatus 500 includes a target volume creation module 503 that is configured to instruct the storage system to create the target volume at the second cluster, and an expansion module 504 that is configured to expand the original volume to the target volume. The example volume expansion method and apparatus are able to perform volume expansion in a case that the storage space required by the target volume is larger than the storage space that can be provided by the cluster where the original volume is located.

When instructing the storage system to create the target volume at the second cluster, the target volume creation module 503 may employ an existing volume creation technique. There are multiple implementations for the cluster lookup module by extending existing techniques. Existing volume expansion technology may be employed to perform volume expansion in the current cluster when the remaining storage space of the first cluster is larger than the storage space required by the target volume whereas the method of performing volume expansion at the second cluster is employed only if the remaining storage space of the first cluster is smaller than the storage space required by the target volume. As such, in one implementation, the cluster lookup module includes a cluster storage space judgment module configured to judge whether the remaining storage space of the first cluster is smaller than the storage space required by the target volume. The cluster lookup module obtains the second cluster located at the storage system in response to the cluster storage space judgment module judging that the remaining storage space of the first cluster is smaller than the storage space required by the target volume.

In another implementation, the cluster lookup module directly looks up the second cluster satisfying the condition and performs volume expansion directly on the second volume without carrying out the judgment. Furthermore, in this implementation, the cluster lookup module may find multiple clusters where the remaining storage space is larger than the storage space required by the target volume. At this time, the cluster with lowest utilization factor among all the clusters where the remaining storage space is larger than the storage space required by the target volume may be selected as the second cluster obtained.

Also, the expansion module can be implemented in many different ways. It can be required to permit the storage system to copy data of the original volume onto the target volume and to cause the host server accessing the original volume to redirect the I/O access to data in the process of volume expansion, considering issues such as the consistency of the data and so on in the copy process and the redirection process, in one implementation. Therefore, the I/O access to data may not be redirected in the copy process due to the time of the copy process being long. As such, the I/O access to data is still performed for the original volume of the first cluster in the copy process and the redirection of the I/O access to data is performed after the copy is finished. The expansion module can thus include a copy module that is configured to instruct the storage system to copy the data located at the original volume to the target volume by using the background copy technology. The expansion module can likewise include a switch module that is configured to switch the I/O access request for the original volume to the target volume, and a deletion module that is configured to instruct the storage system to delete the original volume.

In another implementation, the copy process may be interlaced with the redirection process so as to improve the efficiency of volume expansion. In this implementation, it may be assumed that the storage space of the original volume is A and the storage space of the target volume is (A+B), that is, difference between the storage space of the target volume and that of the original volume is B. If A is larger than B, then it is considered that the probability of the I/O access request for the storage space of size A is higher than that for the storage space of size B, thus, switching of the I/O access request may not be performed firstly and is performed until the background copy is finished. Conversely, if A is less than B, then switching of the I/O access request may be performed at first and then the background copy is performed, so that the I/O access request in the background copy process is directly performed for data in the target volume.

Therefore, in this implementation, the expansion module can include a volume storage space judgment module that is configured to judge whether the storage space difference between the target volume and the original volume is smaller than the storage space of the original volume. The expansion module can include a copy module that is configured to copy the data located at the original volume to the target volume by using a background copy technology, and a switch module that is configured to switch the I/O access request for the original volume to the target volume. The expansion can further include a deletion module that is configured to delete the original volume. In response to the volume storage space judgment module judging that the storage space difference between the target volume and the original volume is smaller than the storage space of the original volume, the copy module, the switch module and the deletion module are operated in the specified order. Further, in response to the volume storage space judgment module judging that the storage space difference between the target volume and the original volume is smaller than the storage space of the original volume, the switch module, the copy module and the deletion module are operated in the specified order.

The copy module copies the data located at the original volume to the target volume. The copy technology herein may use an existing background copy technology in which the storage space size of the target volume is generally larger than that of the original volume. The background copy technology may be considered as an enhanced synchronous mirroring technology. The background copy technology utilizes the principle of online synchronous copy, that is, in the copy process, the source storage unit is still maintained online. If there is an I/O request, then after receiving the I/O request, the source storage unit, in addition to updating the data of its own unit, forwards the I/O request to the target storage unit, and also copies the updated data onto the target storage unit. The source storage unit then responds to the I/O request so as to ensure that the consistency of the target storage unit with the source storage unit can be kept. One method implementing the background copy technology is MetroMirror technology of IBM, another is MirrorView technology of EMC, and so on. The background copy technology is able to ensure that even if a write operation is made to the original volume or the target volume during the process of copy, the data in the original volume for copy is consistent with that in the target volume.

The switch module of the various implementations described above is an indicative module for instructing peripheral devices connected with the storage management system to perform corresponding operations. Since the I/O access request for data is usually issued by the host server connected to a network, the device driver in the host server stores the address mapping relationship between the host server and the volume. The I/O access request for data viewed from the host server side can be simple. As long as the corresponding I/O request is sent to the device driver in the host server, the device driver can send or receive the data in accordance with the stored address mapping relationship between the host server and the volume. Once the target volume is created, the switch module has to modify the address mapping relationship between the host server and the volume in the device driver in the host server so that subsequent I/O access operations may be performed directly on the target volume, and also has to delete the original volume so as to release the storage space.

Therefore, the switch module includes a creation module that is configured to create the address mapping relationship between the host server and the target volume, the device driver of the host server storing the address mapping relationship between the host server and the original volume. The switch module includes a notifying storage module that is configured to notify the device driver of the host server to store the created address mapping relationship between the host server and the target volume. The switch module includes a notifying deletion module that is configured to notify the device driver of the host server to delete the stored address mapping relationship between the host server and the original volume. In the techniques disclosed herein, the switch module causes, through the three modules included therein, the device driver of the host server to automatically modify the address mapping relationship between the host server and the volume stored therein, thus the target volume can be found directly according to the mapping relationship.

If an I/O request is received during the process in which the switch module is operating, a case that data is lost or can not be found may still occur, and at this time, a host application will make an error. In one implementation, then, the switch module further includes a notifying I/O buffer module which is configured to notify, in processes in which the creation module, the notifying storage module and the notifying deletion module are currently operating, the device driver of the host server to perform the following steps or parts. A first step or part is buffering the I/O access request for data in response to receiving an I/O access request for data. A second step or part is sending the I/O access request for data in response to the switch module finishing performance. In general, the device driver of the host server each includes a buffer, and the device driver may perform the above operation upon receiving the instruction from the switch module of the storage management system. In this way, in the working process of a volume expansion apparatus, the running of application on the host does not have to be stopped. Instead, the application on the host can continue to run shortly after buffering is paused when an I/O access operation to data is performed.

Figure 6:
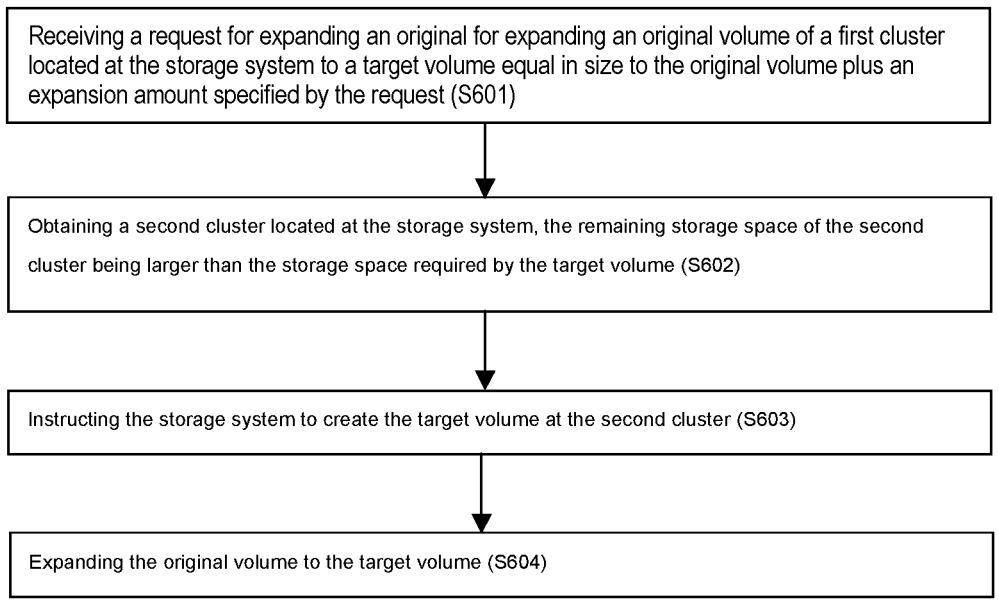
FIG. 6 depicts an example method for performing volume expansion in a storage management system.

The techniques disclosed above can be implemented in conjunction with a storage management system including the apparatus for performing volume expansion in the storage management system. The techniques disclosed above can be implemented in conjunction with a method for performing volume expansion in a storage management system coupled to a storage system via a network. FIG. 6 shows an example method for performing volume expansion in the storage management system. According to FIG. 6, the method includes: receiving a request for expanding an original volume of a first cluster located at the storage system to a target volume (S601). The method includes obtaining a second cluster located at the storage system, the remaining storage space of the second cluster being larger than the storage space required by the target volume (S602). The method includes instructing the storage system to create the target volume at the second cluster (S603), and expanding the original volume to the target volume (S604).

In one implementation, if there are multiple clusters meeting the conditions in the storage system, the cluster with lowest utilization factor among all the clusters where the remaining storage space is larger than the storage space required by the target volume is obtained as the second cluster. In another implementation, obtaining the second cluster located at the storage system further includes the following. It is judged whether the remaining storage space of the first cluster is smaller than the storage space required by the target volume. The second cluster located at the storage system is obtained in response to the remaining storage space of the first cluster being smaller than the storage space required by the target volume.

Figure 7:
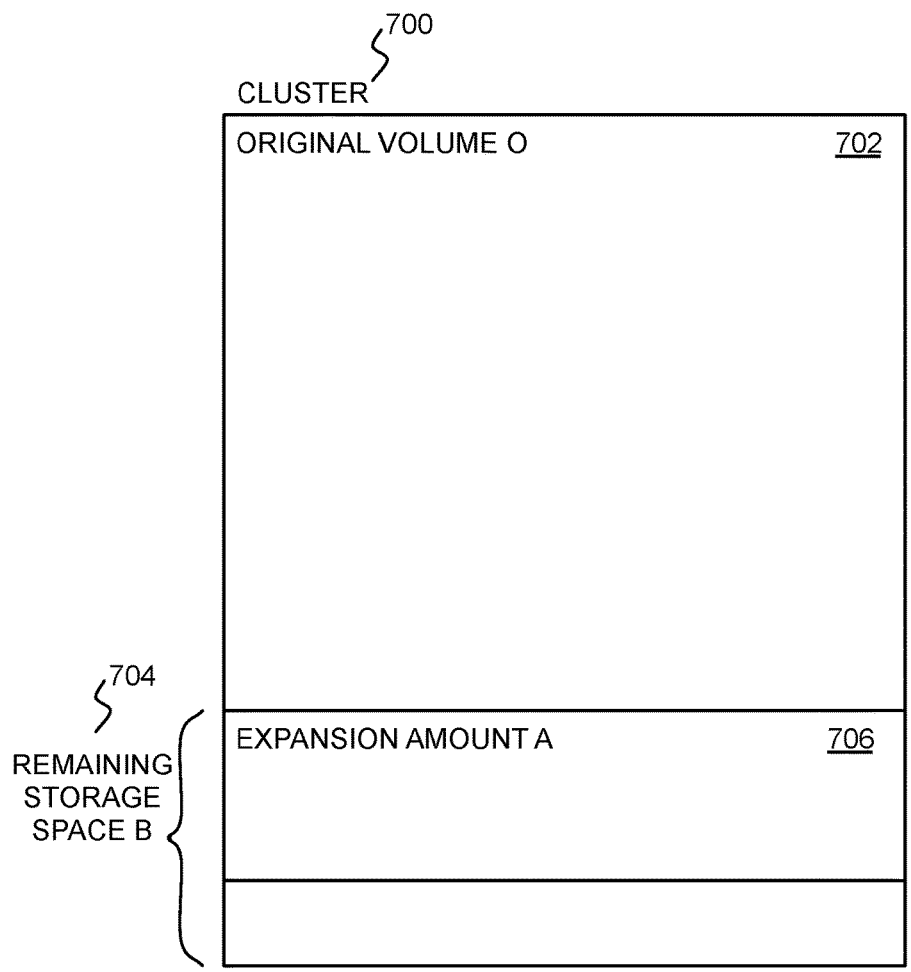
FIG. 7 depicts an example cluster having an original volume, a remaining storage space, and in which an expansion amount is indicated.
Figure 8:
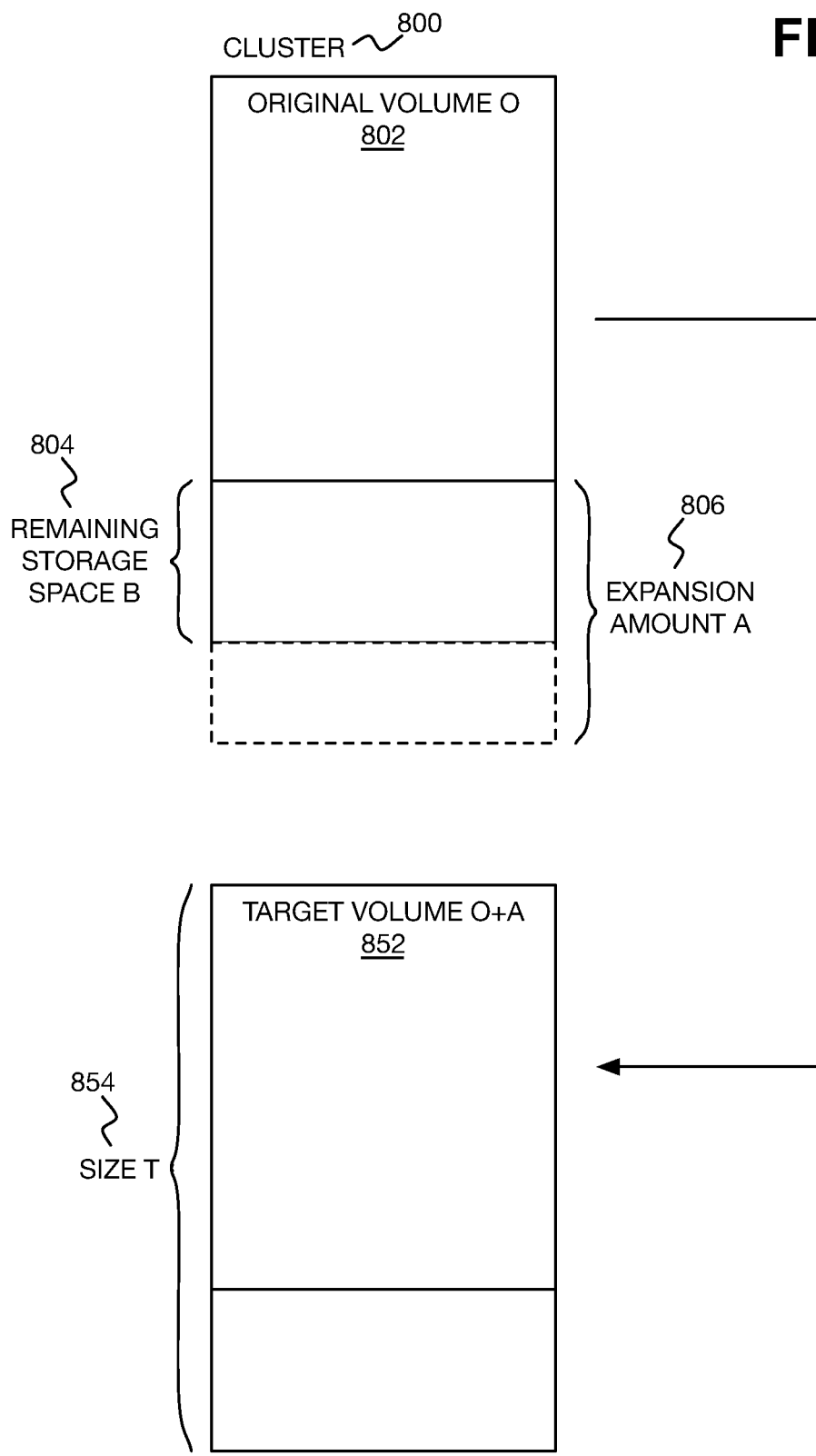
FIG. 8 depicts an example of cluster expansion to a target volume.

This technique is specifically shown in FIG. 7. A first cluster 700 includes an original volume O 702. There is a request to expand the original volume O 702 by an expansion amount A 706. The first cluster 700 has a remaining storage space B 704. As can be seen in FIG. 7, the storage space O+A that is required by a target volume is greater than the remaining storage space B 704 on the first cluster 700. Therefore, it is judged that the original volume O 702 will instead be expanded to a second cluster and not to the first cluster 700.

In one implementation, expanding the original volume to the target volume includes the following. First, the storage system is instructed to copy data located at the original volume to the target volume using a background copy technology. Second, the I/O access request for the original volume is switched to the target volume. The storage system is then instructed to delete the original volume.

In another implementation, expanding the original volume to the target volume includes judging whether the storage space difference between the target volume and the original volume is smaller than the storage space of the original volume. Such expansion also includes, in response to the storage space difference between the target volume and the original volume being smaller than the storage space of the original volume, performing the following. First, the storage system is instructed to copy data located at the original volume to the target volume using a background copy technology. Second, the I/O access request for the original volume is switched to the target volume, and then the storage system is instructed to delete the original volume. In response to the storage space difference between the target volume and the original volume being larger than or equal to the storage space of the original volume, the following is performed. First, the I/O access request for the original volume is switched to the target volume. Second, the storage system is instructed to copy data located at the original volume to the target volume using a background copy technology, and then the storage system is instructed to delete the original volume.

In the this implementation, switching the I/O access request for the original volume to the target volume includes the following. First, the address mapping relationship between the host server and the target volume is created, as is the device driver of the host server storing the address mapping relationship between the host server and the original volume. Second the device driver of the host server is notified to store the created the address mapping relationship between the host server and the target volume. The device driver of the host server is then notified to delete the stored the address mapping relationship between the host server and the original volume. In the process of switching the I/O access request for the original volume to the target volume, the device driver of the host server can further be notified to perform the following. In response to receiving the I/O access request for data, the device driver is to buffer the I/O access request for the data; and in response to the finishing of switching the I/O access request for the original volume to the target volume, the driver is to send the I/O access request for the data.

If an original volume O 802 on a first cluster 800 is to be expanded by an expansion amount A 806 greater than a remaining storage space B 804 of the first cluster 800, then the volume O 802 is expanded at a second cluster 850. The second cluster 850 has a size T 854 equal to or greater than the amount A plus the size O of the original volume. Therefore, a target volume O+A 852 is at the second cluster 850.

Finally, FIG. 9 shows a method that summarizes the techniques described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method for performing volume expansion in a storage management system coupled to a storage system via a network, the method comprising:
    receiving a request for expanding an original volume of a first cluster located at the storage system to a target volume equal in size to an original size of the original volume plus an expansion amount specified by the request, the first cluster including one or more first storage devices of the storage system;
    in response to receiving the request, determining whether a remaining storage space of the first cluster is less than a storage space required by the target volume;
    in response to determining that the remaining storage space of the first cluster is not less than the storage space required by the target volume;
        instructing the storage system to create the target volume at the first cluster;
        expanding the original volume on the first cluster to the target volume on the first cluster by:
            copying the original volume to the target volume on the first cluster using a background copying technique;
            after copying the original volume to the target volume on the first cluster, deleting the original volume;
    in response to determining that the remaining storage space of the first cluster is less than the storage space required by the target volume:
        obtaining a second cluster located at the storage system, a remaining storage space of the second cluster being larger than the storage space required by the target volume, the second cluster including one or more second storage devices of the storage system;
        instructing the storage system to create the target volume at the second cluster; and
        expanding the original volume on the first cluster to the target volume on the second cluster by:
            copying the original volume to the target volume on the second cluster using a background copying technique;
            after copying the original volume to the target volume on the second cluster, deleting the original volume,
    wherein expanding the original volume on the first cluster to the target volume on the first cluster is performed in an identical manner to expanding the original volume on the first cluster to the target volume on the second cluster, except as to where the target volume resides,
    and wherein expanding the original volume to the target volume comprises:
    copying the original volume to the target volume;
    while the original volume is being copied to the target volume and in response to determining that the original size of the original volume is greater than the expansion amount, directing input/output requests for the original volume to the original volume; and
    while the original volume is being copied to the target volume and in response to determining that the original size of the original volume is less than the expansion amount, directing the input/output requests for the original volume to the target volume.

2. The method according to claim 1, further comprising switching an I/O access request for the original volume to the target volume by:
    creating an address mapping relationship between a host server and the target volume, a device driver of the host server storing an address mapping relationship between the host server and the original volume;
    notifying the device driver of the host server to store the created the address mapping relationship between the host server and the target volume; and
    notifying the device driver of the host server to delete the stored address mapping relationship between the host server and the original volume.

3. The method according to claim 2, wherein notifying the device driver of the host server comprises notifying the device driver to perform:
    in response to receiving an I/O access request for data, buffering the I/O access request for data; and
    in response to the finishing of switching the I/O access request for the original volume to the target volume, sending the I/O access request for data.

4. The method according to claim 1, wherein the second cluster is a cluster with lowest utilization factor among all the clusters where a remaining storage space is larger than the storage space required by the target volume.

5. An apparatus for performing volume expansion in a storage management system coupled to a storage system via a network, the apparatus comprising:

hardware, including a processor and memory;

a request reception module implemented at least by the hardware to receive a request for expanding an original volume of a first cluster located at the storage system to a target volume equal in size to an original size of the original volume plus an expansion amount specified by the request, and to determine whether the first cluster has a remaining storage space required by the target volume, the first cluster including one or more first storage devices of the storage system;

a cluster lookup module implemented at least by the hardware to, if the remaining storage space of the first cluster is less than the storage space required by the target volume, obtain a second cluster located at the storage system, a remaining storage space of the second cluster being larger than the storage space required by the target volume, the second cluster including one or more second storage devices of the storage system;

a target volume creation module implemented at least by the hardware to instruct the storage system to create the target volume at the second cluster; and an expansion module implemented at least by the hardware to expand the original volume on the first cluster to the target volume on the second cluster by copying the original volume to the target volume on the second cluster using a background copying technique, and after copying the original volume to the target volume on the second cluster deleting the original volume.

6. The apparatus according to claim 5, the expansion module comprising:

a volume storage space judgment module to judge whether a storage space difference between the target volume and the original volume is smaller than a storage space of the original volume;

a copy module to instruct the storage system to copy data located at the original volume to the target volume using the background copy technique;

a switch module to switch an I/O access request for the original volume to the target volume; and a deletion module to instruct the storage system to delete the original volume, wherein, in response to the volume storage space judgment module judging that the storage space difference between the target volume and the original volume is smaller than the storage space of the original volume, the copy module, the switch module, and the deletion module are operated.

7. The apparatus according to claim 5, wherein the switch module comprises:

a creation module to create an address mapping relationship between a host server and the target volume, a device driver of the host server storing an address mapping relationship between the host server and the original volume;

a notifying storage module to notify the device driver of the host server to store the created the address mapping relationship between the host server and the target volume; and a notifying deletion module to notify the device driver of the host server to delete the stored address mapping relationship between the host server and the original volume.

8. The apparatus according to claim 7, wherein the switch module further comprises a notifying I/O buffer module to, during operation of the creation module, the notifying storage module, and notifying deletion module, notify the device driver of the host server to:

in response to receiving an I/O access request for data, buffer the I/O access request for data; and in response to finishing of operation of the switch module, sending I/O access request for data.

9. The apparatus according to claim 5, wherein the second cluster is the cluster a lowest utilization factor among all the clusters where a remaining storage space is larger than the storage space required by the target volume.

10. A storage management system, comprising an apparatus for performing volume expansion in the storage management system, wherein the apparatus comprises:

hardware, including a processor and memory;

a request reception module implemented at least by the hardware to receive a request for expanding an original volume of a first cluster located at the storage system to a target volume equal in size to an original size of the original volume plus an expansion amount specified by the request and to determine whether the first cluster has a remaining storage space required by the target volume, the first cluster including one or more first storage devices of the storage system;

a cluster lookup module implemented at least by the hardware to, if the remaining storage space of the first cluster is less than the storage space required by the target volume, obtain a second cluster located at the storage system, a remaining storage space of the second cluster being larger than the storage space required by the target volume, the second cluster including one or more second storage devices of the storage system;

a target volume creation module implemented at least by the hardware to instruct the storage system to create the target volume at the second cluster; and an expansion module implemented at least by the hardware to expand the original volume to the target volume by copying the original volume to the target volume on the second cluster using a background copying technique, and after copying the original volume to the target volume on the second cluster deleting the original volume.

* * * * *